E. L. SCHUH.
RUNNER ATTACHMENT FOR AUTOMOBILES.
APPLICATION FILED MAY 21, 1912.
1,056,063.
Patented Mar. 18, 1913.
2 SHEETS—SHEET 2.
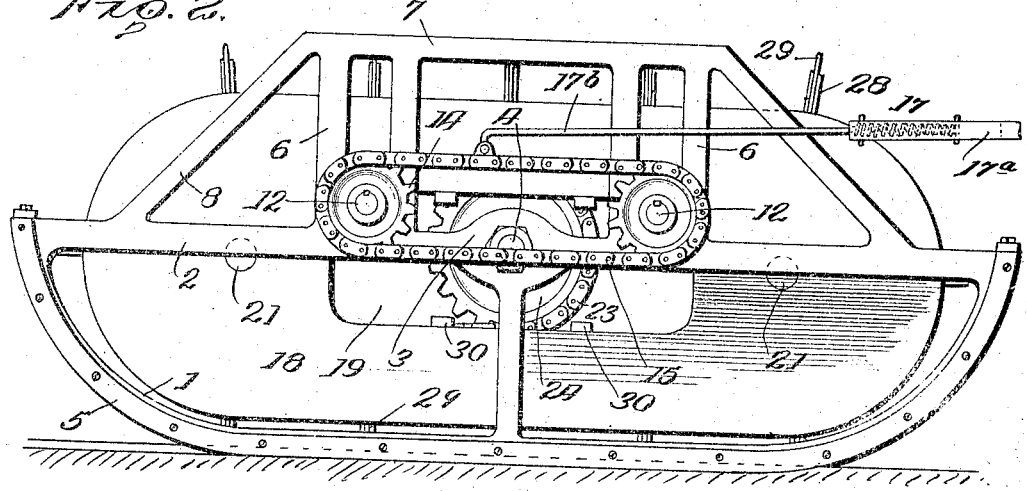
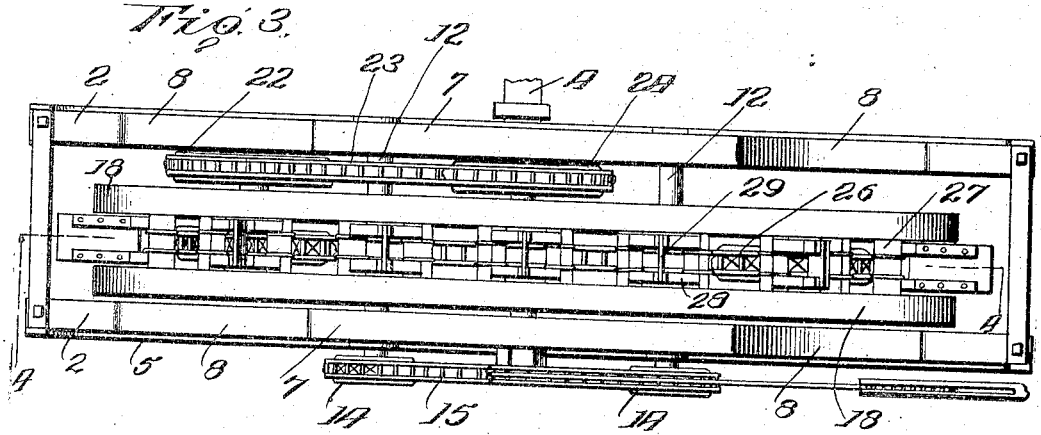
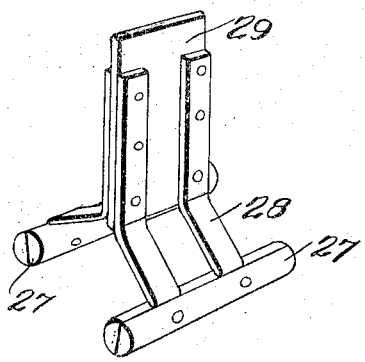
Witnesses
Inventor
E. L. Schuh
By
Attorneys.

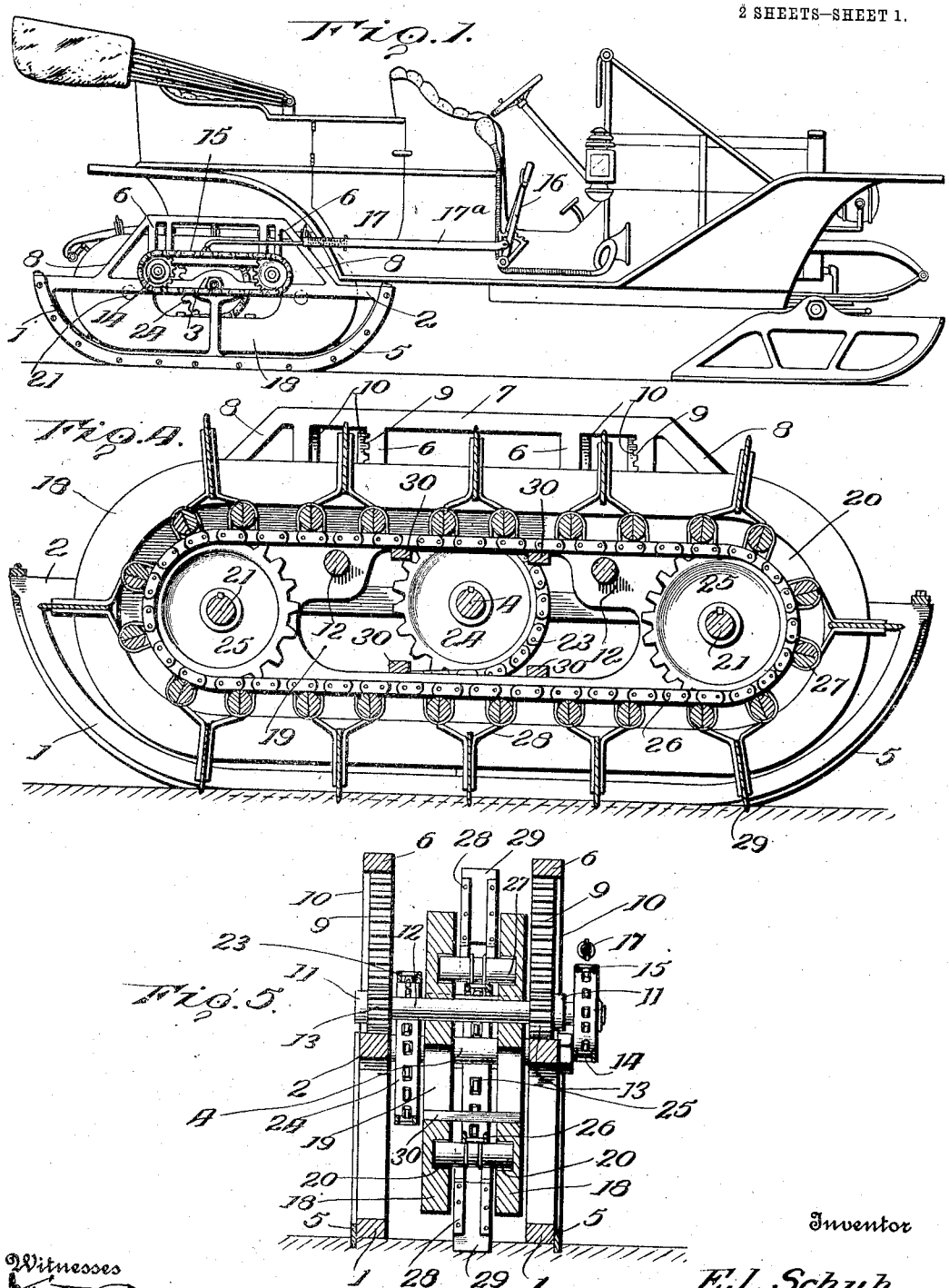

UNITED STATES PATENT OFFICE.

EDWARD L. SCHUH, OF COLBY, WISCONSIN.

RUNNER ATTACHMENT FOR AUTOMOBILES.

1,056,063.  Specification of Letters Patent.  Patented Mar. 18, 1913.

Application filed May 21, 1912. Serial No. 698,765.

*To all whom it may concern:*

Be it known that I, EDWARD L. SCHUH, citizen of the United States, residing at Colby, in the county of Marathon and State of Wisconsin, have invented certain new and useful Improvements in Runner Attachments for Automobiles, of which the following is a specification.

This invention is a runner attachment for automobiles whereby the vehicle may be utilized in winter as well as in summer and may be propelled under its own power without burning out tires or any excessive strain on the engine.

The invention seeks to provide an attachment of the stated character which may be readily applied to any standard automobile, and in which the propellers may be withdrawn into an inoperative position when the vehicle is not in use.

The invention also seeks to improve, generally, attachments of this type whereby the operation will be more certain and the apparatus more durable than devices for the same purpose heretofore known.

The invention is illustrated in the accompanying drawings and will be hereinafter fully described, the novel features being subsequently pointed out in the claims following the description.

In the drawings:—Figure 1 is an elevation of an automobile showing my improved attachment applied thereto; Fig. 2 is an enlarged elevation of the attachment removed from the automobile; Fig. 3 is a plan view of the same; Fig. 4 is a longitudinal section of the apparatus; Fig. 5 is a transverse section of the same; Fig. 6 is a detail perspective view of one of the propellers.

In carrying out my invention, I provide an apparatus which is to be mounted upon the rear axle of the automobile as a substitute for each of the rear driving wheels. This attachment comprises a pair of runners 1 having their ends connected by beams 2 which are provided at their centers with bearings 3 to fit upon the rear axle 4 of the automobile. To the outer face of each runner, I secure a guard-plate 5 which projects slightly below the under side of the runner and takes into the ground, as shown clearly in Fig. 5, so as to prevent tilting or skidding of the runners. Upon the beams 2, I provide slotted standards 6 connected at their upper ends by braces 7 and also reinforced by inclined braces 8 extending between their upper ends and the beams 2, as shown most clearly in Fig. 2. The standards 6 are constructed with racks 9 upon one wall of the slot in the standard and are also formed with flanges 10 which extend slightly across the said slots, so as to engage boxes 11 constituting bearings for shafts 12 which have fixed thereon pinions 13 meshing with the racks 9. By rotating these shafts, the propeller supporting and guiding plates will be raised and lowered, and to effect rotation of the said shafts, sprocket wheels 14 are provided on their outer ends and connected by a sprocket chain 15, as clearly shown. The necessary movement of the chain is effected by a hand lever 16 disposed adjacent the chauffer's seat and connected by a link 17 with the chain. The link 17 is composed of a tubular member 17$^a$ pivoted to the lever and a member 17$^b$ pivotally attached to the chain at its outer end and having its inner end fitting within the said tubular member. A pin passes through the tubular member and a slot in the member 17$^b$ to prevent separation of the members while a spring, coiled within the tubular member between a stop therein and the end of the member 17$^b$, serves to hold the latter normally projected so that movement of the lever will actuate the chain. Should the propellers strike an unyielding obstruction in the road, the members of the link will telescope so as to cushion the blow and prevent breaking of the parts.

It will be readily understood that by manipulating the lever 16, the sprocket chain 15 will be caused to move in either direction and consequently the sprockets 14 will be rotated so as to rotate the shafts 12 to which they are respectively secured, and the rotation of the said shafts 12 will cause the pinions 13 to travel up or down upon the racks 9 and consequently raise or lower the propeller carrying and guiding frame supported by said shafts.

The propeller carrying and supporting frame consists of two parallel plates 18 having central openings 19 to clear the rear axle 4 and provided on their inner opposed faces with elliptical grooves 20 which form guides for the ends of the propeller bodies. Propeller shafts 21 are journaled in the said plates 18 at the ends thereof, and one of the shafts is extended inwardly beyond the inner plate 18 and equipped with a sprocket wheel 22 over which a sprocket chain 23 passes to connect the said wheel 22 with a similar sprocket wheel 24 fixed upon the rear axle 4 of the vehicle. Sprocket wheels 25 are fixed upon the shafts 21 between the plates 18, and the propeller chain 26 is trained around the said sprockets.

The propeller bodies consist of pins 27 secured to the outer side of the propeller chain 26 and arranged in pairs along the length thereof, at any desired intervals according to the size and weight of the machine to be propelled. These pins 27 have secured thereto outwardly converging brackets or straps 28, to and between which blades 29 are secured, the said blades 29 being projected beyond the ends of the said brackets or straps 28, so that their outer ends or edges will take into the ground or the hard packed snow or ice upon which the automobile is to travel, and consequently serve to impart the desired movement to the vehicle, as will be readily understood. The plates 18 are held together, so as to maintain the propellers in proper position, by cross bars 30 extending through the openings 19, as shown clearly in Figs. 2, 4 and 5.

The operation of my improved apparatus will, it is thought, be readily understood. The runners having been fitted upon the rear axle of the car, the lever 16 is manipulated to rotate the shafts 12, and through the rotation of said shafts lower the propellers into engagement with the ground in the manner before described. The engine being then started, the rotation of the rear axle will actuate the sprocket 24 and transmit the movement of said sprocket through the chain 23 and the sprocket 22 to the rear propeller shaft 21, which will thereupon actuate the propeller chain 26. The movement thus imparted to the propeller blades will cause the same to act as levers fulcrumed upon the ground to move the vehicle forward, so that the desired travel will be effected smoothly and without excessive strain upon the engine. Of course, as the rear traction wheels have been removed, the tires thereon are not in use and cutting of the same through contact with ice and the wearing of the same through the rotation thereof against ice without moving over the same will not occur.

The ends of the pins 27, constituting the propeller bodies, project laterally from the propeller chain, as shown clearly in Fig. 5, and engage the grooves 20 in the plates 18 constituting the propeller supporting frame, so that the propeller blades will be lifted easily from the ground and carried positively into engagement therewith as the vehicle proceeds. These guiding grooves serve also to support the propellers and consequently relieve the chain 26 of the weight of the propellers, so that breaking of the chain will not readily occur. The chain being thus relieved of the carrying strain, the full strength of the motor will be transmitted through the same to propel the vehicle.

My device is exceedingly compact in the arrangement of its parts and may be readily applied to any type of car. It may be produced at a comparatively low cost and will be highly efficient in use.

While I have illustrated sprocket chains and sprocket wheels, it will be understood, of course, that the invention is not confined to this form of power transmitting mechanism, but that other gearing may be used and any type of flexible connection may be substituted for the sprocket chain, and that other modifications may be made without departing from the spirit or scope of the invention as the same is defined in the following claims.

What I claim is:—

1. A runner attachment for vehicles comprising a pair of runners, slotted standards rising from said runners, racks upon said standards, shafts passing through the slots of said standards, pinions upon said shafts engaging said racks, means for simultaneously rotating said shafts, and propeller mechanism carried by said shafts.

2. A runner attachment for vehicles comprising a pair of runners, slotted standards rising from said runners, racks on said standards, shafts passing through the slots of said standards, pinions on said shafts engaging said racks, sprocket pinions on the outer ends of said shafts, a chain connecting said sprocket pinions, means for actuating said chain, and propeller mechanism carried by said shafts.

3. A runner attachment for vehicles comprising a pair of runners adapted to be fitted upon an axle of the vehicle, a frame consisting of parallel plates disposed between the runners, means upon the runners for raising and lowering said plates, propellers supported by said plates and moving between the same, and means for actuating said propellers from the axle of the vehicle.

4. A runner attachment for vehicles comprising a pair of runners adapted to be fitted upon an axle of the vehicle, a pair of parallel plates disposed between the runners and having guides upon their opposed faces, a chain of propellers supported by and moving along said guides, means for actuating said propellers from the axle of the vehicle, and means upon the runners for raising and lowering said plates.

5. A runner attachment for vehicles comprising a pair of runners adapted to be fitted upon an axle of the vehicle, a pair of parallel plates disposed between the runners and having elliptical grooves in their opposed faces, a chain of propellers comprising pins engaging said grooves and blades carried by and projecting outwardly from said pins, means for actuating said propellers from the axle of the vehicle, and means for raising and lowering said plates.

6. A runner attachment for vehicles comprising a pair of runners adapted to be fitted upon the axle of the vehicle, a pair of plates disposed between the runners and having openings whereby they may clear the axle, means for raising and lowering said plates, an endless conveyer between said plates, propellers comprising pins secured upon and projecting laterally from said conveyer to engage said plates and be guided thereby, brackets secured to and extending outwardly from said pins and blades carried by said brackets, and means for actuating said conveyer from the axle of the vehicle.

7. A runner attachment for vehicles comprising a pair of runners, slotted standards rising from said runners, racks on said standards, shafts passing through the slots of said standards, pinions on said shafts engaging said racks, sprocket pinions on the outer ends of said shafts, a chain connecting said sprocket pinions, propeller mechanism carried by said shafts, an operating lever, an extensible link connecting the lever with said chain, and means for holding the link normally extended.

8. A runner attachment for vehicles comprising a pair of runners adapted to be fitted upon the axle of the vehicle, a chain of propellers arranged between the runners and comprising pins arranged transversely in pairs, outwardly converging straps secured to and projecting from the pairs of pins and blades secured between said straps and projecting beyond the same, and means for actuating said propellers.

In testimony whereof I affix my signature in presence of two witnesses.

EDWARD L. SCHUH. [L. S.]

Witnesses:
R. G. SALLIN,
A. MATTHEIS.

---

Copies of this patent may be obtained for five cents each, by addressing the "Commissioner of Patents, Washington, D. C."